(No Model.)  2 Sheets—Sheet 1.
C. H. CRAMER.
WIND ENGINE.
No. 294,369. Patented Mar. 4, 1884.
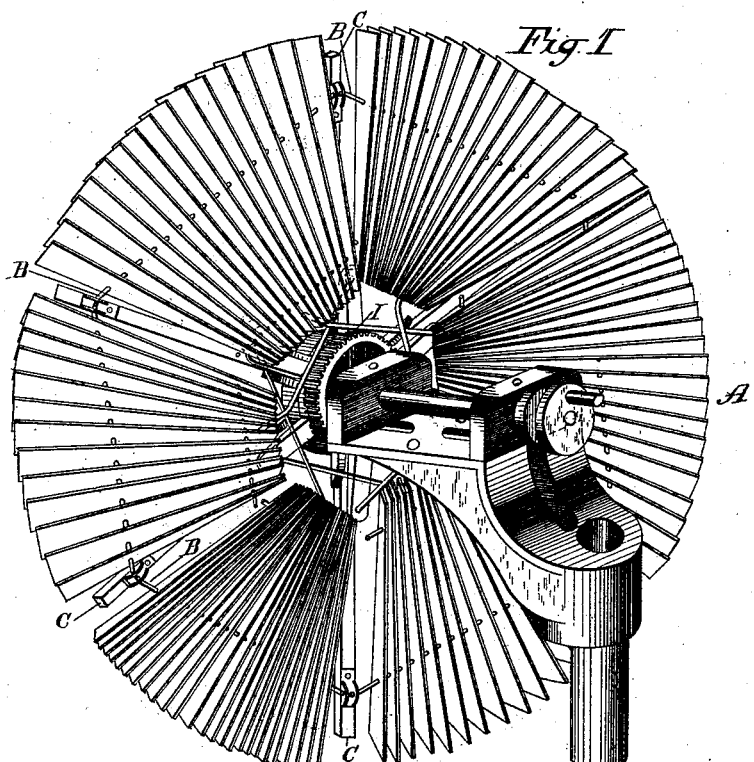
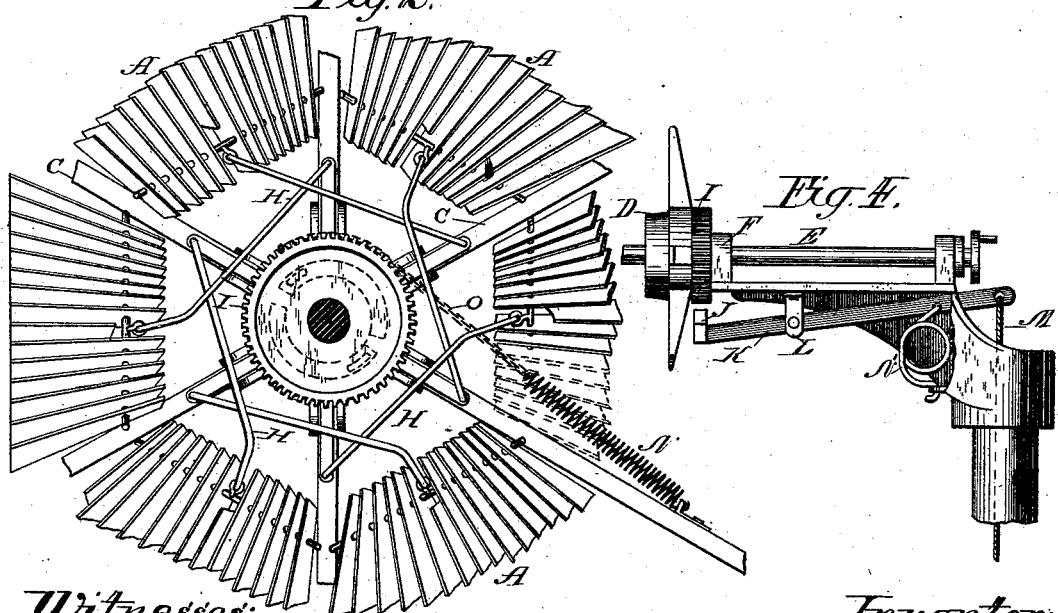

(No Model.) 2 Sheets—Sheet 2.
C. H. CRAMER.
WIND ENGINE.
No. 294,369. Patented Mar. 4, 1884.
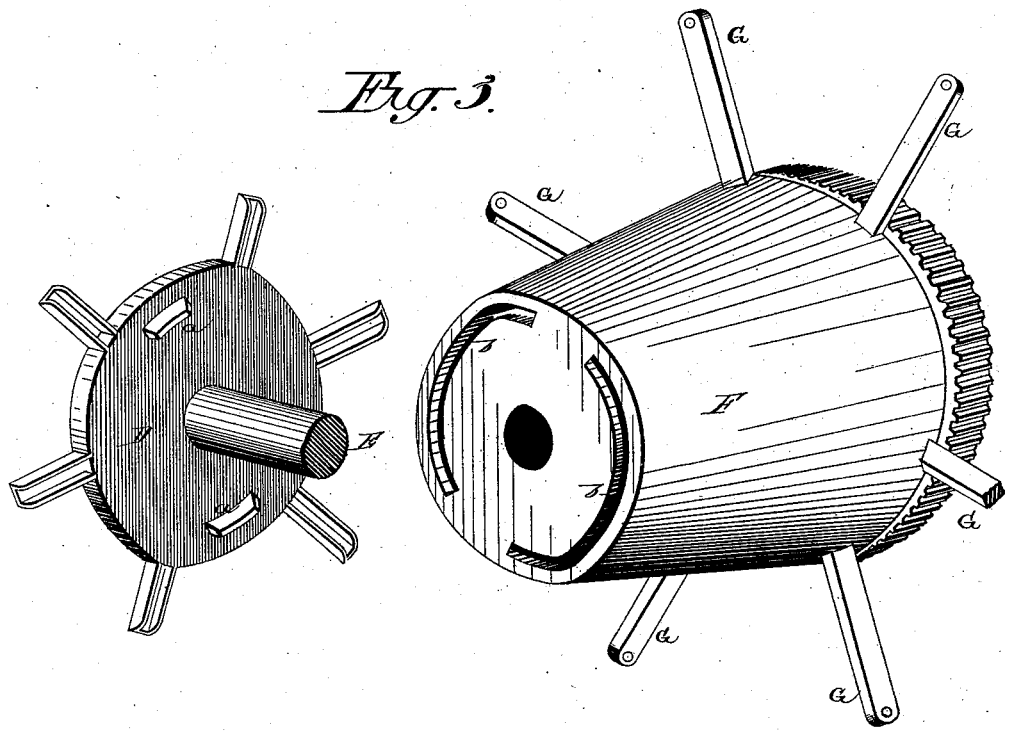
Witnesses:
C. B. Story.
Wm Sinnott.
Inventor:
Charles H. Cramer
By, Jas. P. Enwin
Attorney.

UNITED STATES PATENT OFFICE.

CHARLES H. CRAMER, OF LAKE MILLS, WISCONSIN.

WIND-ENGINE.

SPECIFICATION forming part of Letters Patent No. 294,369, dated March 4, 1884.

Application filed March 5, 1883. (No model.)

*To all whom it may concern:*

Be it known that I, CHARLES H. CRAMER, a citizen of the United States, residing at Lake Mills, in the county of Jefferson and State of Wisconsin, have invented certain new and useful Improvements in Wind-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 represents a perspective view of my invention. Fig. 2 is a front view with the margin of the wheel removed. Figs. 3 and 4 are detail views.

Like parts are represented by the same reference-letters.

The wheel is formed in sections A, which are adapted to turn on the rods B when desirous to throw the sections out of the wind. The rods B are supported at their ends by radial arms C, which arms are rigidly attached to the hub D. The hub D is permanently attached to the shaft E.

F is a movable collar, which is loosely fitted to the shaft E. The collar F is provided with radial arms G, which are connected with the respective sections A by rods H. The collar F is provided with recesses $b$ for the reception of lugs $a$, formed on hub D, the lugs $a$ $a$ being brought into said recesses as said hub and collar are brought in contact, as shown in Fig. 4.

I is a friction-wheel, to which the brake J is applied when desirous to stop the wheel. The brake J is actuated by lever K and cord M, said lever being pivoted to the bracket L. N' is a spring by which the brake is thrown out of contact with the wheel I when the cord M is released.

When desirous to stop the wind-wheel the brake J is thrown in contact with the wheel I, whereby its motion is arrested, when by the continuous forward movement of the wind-wheel the lower ends of the respective sections A are thrown outward by the rods H, thereby bringing the sections into a horizontal position, whereby the wind ceases to act on them and the wheel ceases to revolve. When the motion of the collar F is thus arrested, the lugs $a$ $a$ on the hub move forward in the recesses $b$ $b$ until they come in contact with the end of the recess, when they arrest the forward movement of the wind-wheel and relieve the rods H.

N is a tension-spring, which is attached at one end to one of the arms C, and its other end is connected with the collar F by chain or other flexible attachments, O. The object of the spring N is to stop the motion of the wheel gradually, thereby preventing injury to the machine, which would occur were the wheel instantaneously stopped as soon as the brake is applied.

It is obvious that when the collar F is stopped by the brake the further forward movement of the wheel is resisted by the spring N, and the spring is gradually drawn out until checked by contact of the lug $a$ with the end of the slot $b$.

When desirous to start the wheel, the brake J, being released from contact with the wheel I, the collar F is drawn forward by the spring N, when the arms G and rods H, which are connected with said collar, are drawn forward, whereby the lower ends of the several sections are drawn downward, thereby bringing the sections into a vertical position in contact with the wind.

It will be observed that the several sections A are connected by rods H with the second succeeding arms, G, thereby leaving sufficient space for the movement of the wheel toward said arms H (said arms H being at rest) to throw said section into the horizontal position. It is also obvious that by connecting said sections to arms of the wheel so far removed from the sections, the angle of said rods H is so increased as to act with greatest efficiency.

Having thus described my invention, what I claim as new, and desire to secure by Letters Patent, is—

The combination of the windmill-hub D, provided with lugs $a$, shaft E, collar F, provided with recesses $b$ and arms G, chain O, spiral spring N, radial arms C, rods H, and sections A, said lugs $a$ $a$ being adapted to move in the recesses $b$ $b$, and said chain being adapted to be wound upon said collar, and said spiral spring extended as the motion of said collar F is resisted by the action of the brake, while said sections A are thrown from a vertical into a horizontal position out of the wind as said wheel moves forward by the action of said rods H, said collar being moved forward, and said sections brought into the vertical position by the said spring when the resistance of the brake is removed, all for the purpose and substantially as specified.

In testimony whereof I affix my signature in presence of two witnesses.

CHARLES H. CRAMER.

Witnesses:
 W. J. SINNOTT,
 JAS. B. ERWIN.